SCANNING DETECTOR AND ELECTRIC PROCESSING SYSTEM

Filed March 7, 1960 4 Sheets-Sheet 1

INVENTOR.
ROBERT W. ASTHEIMER

BY Robert Ames Norton

ATTORNEY

SCANNING DETECTOR AND ELECTRIC PROCESSING SYSTEM

Filed March 7, 1960 4 Sheets-Sheet 2

INVENTOR.
ROBERT W. ASTHEIMER

BY Robert Ames Norton

ATTORNEY

Oct. 3, 1961 R. W. ASTHEIMER 3,003,026

SCANNING DETECTOR AND ELECTRIC PROCESSING SYSTEM

Filed March 7, 1960 4 Sheets-Sheet 3

INVENTOR.
ROBERT W. ASTHEIMER

BY Robert Ames Norton

ATTORNEY

SCANNING DETECTOR AND ELECTRIC PROCESSING SYSTEM

Filed March 7, 1960 4 Sheets-Sheet 4

INVENTOR.
ROBERT W. ASTHEIMER
BY
ATTORNEY

United States Patent Office 3,003,026
Patented Oct. 3, 1961

3,003,026
SCANNING DETECTOR AND ELECTRIC PROCESSING SYSTEM

Robert W. Astheimer, Westport, Conn., assignor to Barnes Engineering Company, Stamford, Conn., a corporation of Delaware
Filed Mar. 7, 1960, Ser. No. 13,124
6 Claims. (Cl. 178—7.1)

This invention relates to an improved combination of scanning detector electronic processing circuits. More particularly the invention relates to such combinations in which the detector is an infrared detector.

The problem of scanning an image received by suitable optics to produce an electrical signal which is processed and reproduces the original image, for example on a cathode ray tube, or produces a record corresponding to the image presents a serious problem in systems and with radiations where a single, small detector is used. The problem is not so serious where the image is instantaneously reproduced in photographic form and is electronically scanned, for example, in a television camera. However, where the scanning requires mechanical movement of either the detector or part of its associated optics very serious problems arise. The most important field is in infrared cameras although problems arise and the present invention may be used in the solution of similar problems where other types of infrared instruments require the scanning by mechanical means of an image. Therefore, the present invention will be described in connection with its use in an infrared camera and with a solution of the problems thereof although it should be understood that the other elements of the camera and its system do not form any part of the present invention which is, therefore, not limited to this use.

One of the most serious problems arising in infrared cameras and similar infrared instruments lies in the fact that these instruments frequently have to be used at high sensitivity. If an ordinary D.C. amplifier is used covering a wide band which is necessary to pass the image information serious difficulties arise from drift, noise and other factors. In the past this has constituted a serious limitation on the effectiveness of infrared cameras and similar instruments.

If it is attempted to chop the whole of the radiation at a frequency sufficiently high to preserve the video information in the image some of the drift problems are solved but only at the expense of lower detector sensitivity and other drawbacks. Speed of scanning is also reduced.

The present invention retains full advantages of a D.C. amplifier without its drawbacks. Essentially in the present invention an infrared detector scans mechanically the image to produce an electrical signal from successive horizontal lines in the form of a raster or any other scanning motion which produces a raster of repeating scans.

A portion only of the light energy is chopped at a different net frequency depending on the requirements, the chopping being at a much higher frequency than the bandpass of the amplifiers required to pass the video information. Preferably scanning is at twice the maximum frequency required which corresponds to one cycle for two picture elements.

Part of the energy remains unchopped and thus the signal from the scanning detector contains three types of information, unchopped information throughout the whole band of image information, a higher frequency chopping signal, usually a square wave, and video modulation at low frequency of the higher frequency wave produced by chopping. After preliminary amplification in an A.C. amplifier the modulated chopped frequency carrier with its video information in the low frequency portion of the passband is separated from the unchopped signal information and the two are processed separately, the former in a chop frequency amplifier, the latter in an amplifier passing only the upper portion of the total band of frequencies. Then the chop frequency signal is demodulated with a suitable low pass filter removing the chop frequency carrier and reproducing the low frequency modulation. The two signals are then combined and a final signal having the total range is produced.

To visualize the above procedure a concrete case may be taken.

An infrared camera using a detector with a time constant of the order of one millisecond scans a scene in approximately two minutes. The scanning rate is about 160 lines and involves a bandwidth of 400 cps. for $1 \times 1$ milliradian resolution. The frequency corresponds to the television criterion of one cycle for each two picture elements. The chopping frequency is 800 cps. in order to get maximum detector rejection of the frequency. At twice the maximum frequency the rejection is complete and, therefore, there will be no responses from the detector at the 800 cps. chop frequency.

The detector signal is then amplified in a preamplifier and a main amplifier both of which are A.C. This output signal is fed to a bandpass amplifier passing 50 to 400 cps. It is also fed to a synchronous detector circuit which receives a chopped frequency signal which is, therefore, modulated by the zero to 50 cps. portion of the detector signal. The output from the synchronous detector amplifier is then passed through a low pass filter or integrating circuit which rejects the chopped frequency leaving only the modulation envelope. The final outputs of the amplifier and synchronous detector are then combined in conventional adding circuits and contain all of the video information from zero to 400 cps. The A.C. amplifiers which do most of the amplifying are not subject to the type of noise problem encountered in an all D.C. amplifier and so the problem of noise is very markedly reduced though, of course, not completely eliminated since this is impossible in any electronic circuit. A greatly improved final output signal is obtained and it is obtained without complex equipment and with amplifiers of maximum reliability. The amplification of the chop frequency is in a sync detector type of circuit which receives a reference signal at chop frequency by conventional reference signal pickups.

When the combination of the present invention is used in infrared cameras in which the final output signal is used to produce a picture on a cathode ray tube there is no problem with periodic fluctuations which should be integrated by the eye in such a tube. The picture is of maximum uniformity and resolution, within the limits of the capabilities of the components.

While the present invention is not broadly concerned with any particular specific scanning mechanism it will be described in conjunction with infrared camera use and two typical scanning mechanisms will be described in the drawings in which.

Figure 1:
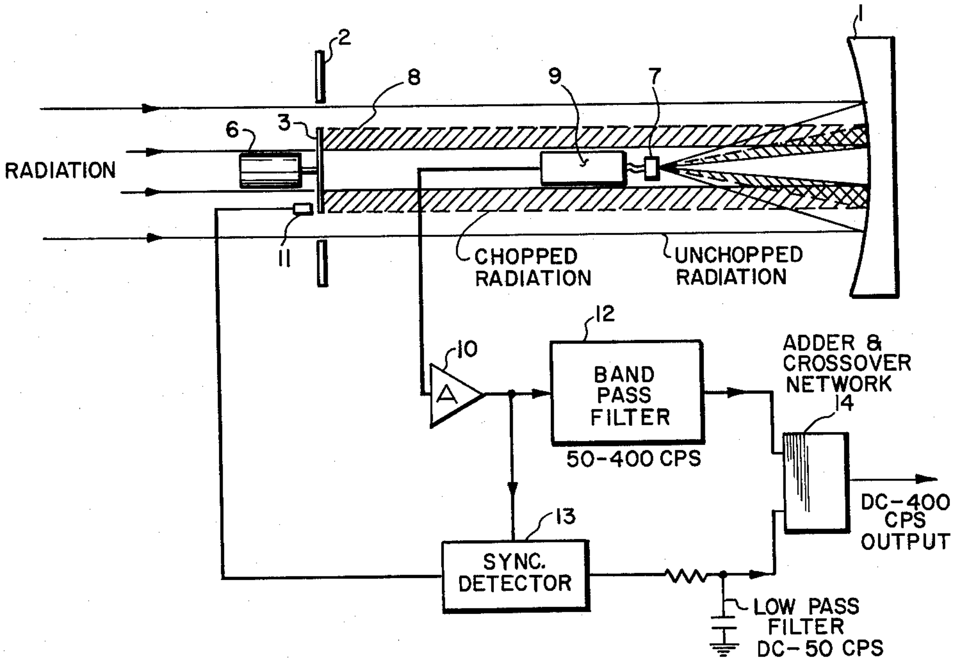
FIG. 1 is a diagrammatic representation of the general organization of the invention.

FIG. 1 shows schematically the general organization of the present invention. Infrared radiation from a distant object strikes a collecting mirror 1 which may be spherical. The system is provided with an aperture 2 in which is centered a chopper 3 driven by a motor 6 and carrying a reference pickup 11.

Radiation from the mirror 2 is imaged on a detector 7 which is at the center of curvature of the mirror and which is moved from right to left and more slowly vertically to scan a raster. Typical drive means for the detector are shown in FIGS. 3 to 5.

The chopper 3, which for example, can chop at a frequency of 800 cps. chops only a portion of the radiation. For simplicity this portion is shown shaded. The remainder of the radiation is unchopped. The detector 7, therefore, receives some chopped signal, for example, about 70 percent of the energy, and some unchopped and as the detector is moved it produces a signal corresponding to image brightness. The preamplifier 9 and amplifier 10, both amplify the detector signal. Then this signal is impressed on two electronic circuits, one a bandpass filter amplifier 12 which responds to 50–400 cps. signal and second, a synchronous detector 13 which receives chop frequency signal from the pickup 11 as well as the modulated chop frequency component from amplifier 10. The output from the sync detector 13 then passes through a conventional low pass filter or integrator circuit which passes D.C. to 50 cps. The two outputs are added in a conventional adder and crossover network 14 and an output is obtained containing the video information from the image from D.C. to 400 cps.

Figure 2:
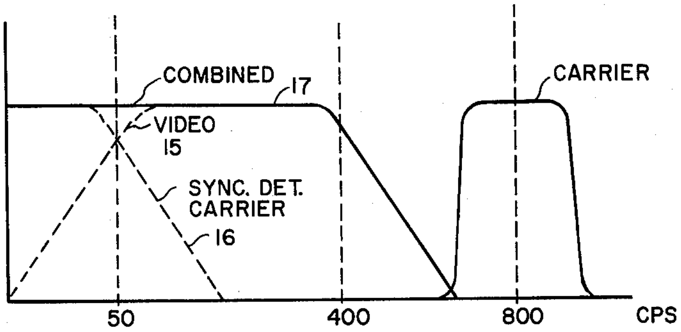
FIG. 2 is a diagram of the output signal.

FIG. 2 shows the nature of the three signals. The carrier is a square wave at chop frequency. There is video information from the circuit 12 shown in dash lines at 15 and finally the modulation of the sync detector carrier shown in dash lines at 16. Since the carrier itself is separated out by the low pass filter the resulting combined signal is shown by the solid line marked "combined" and it will be seen that the amplification is substantially flat from zero almost to 400 cps. with sharp falling off thereafter.

Figure 3:
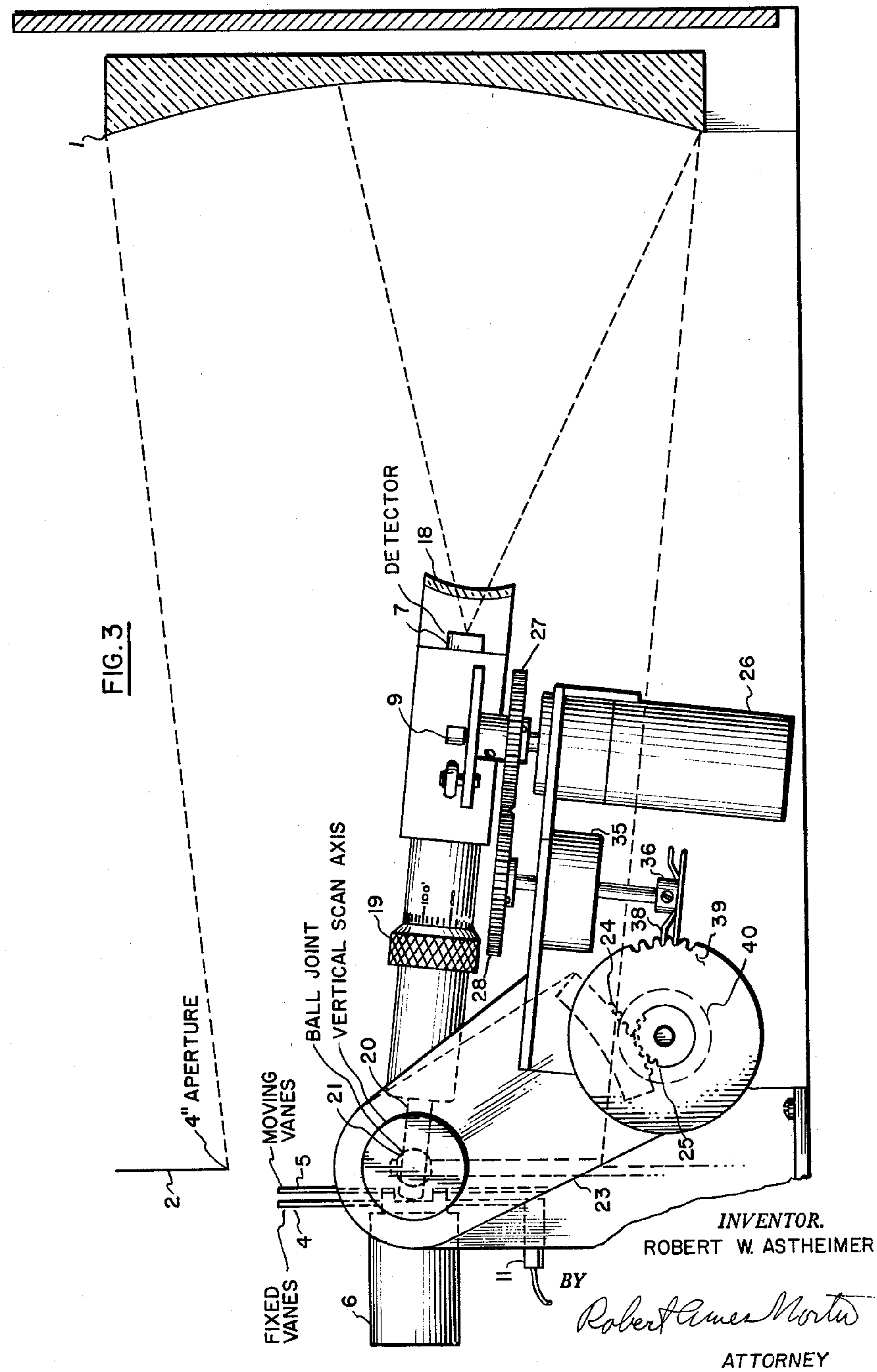
FIG. 3 is an elevation of a scanning head and optics using a movable detector.
Figure 4:
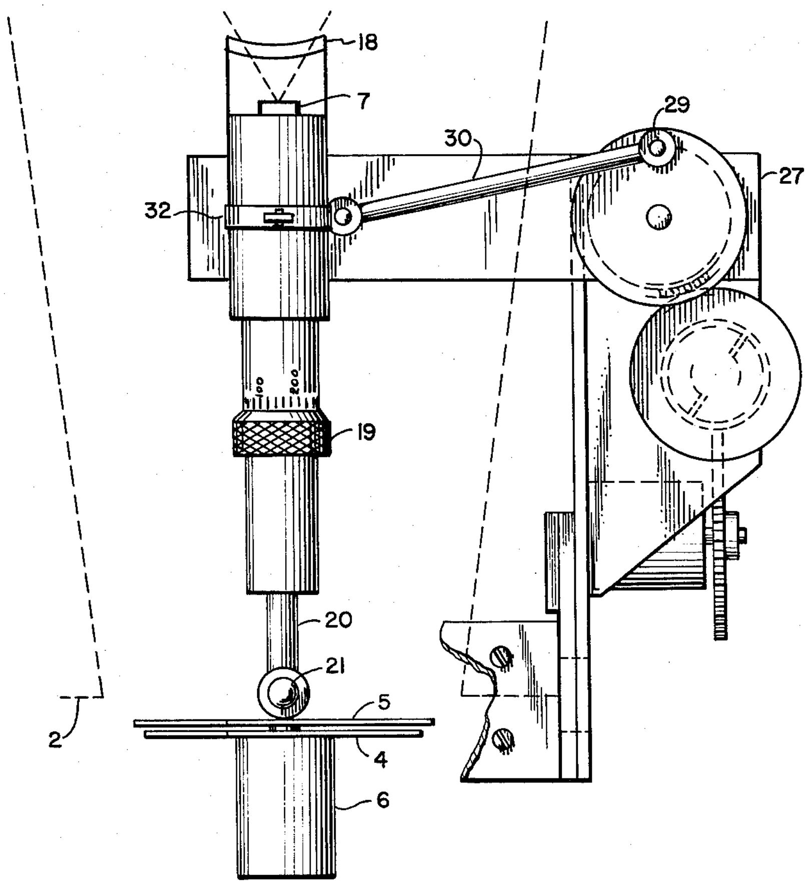
FIG. 4 is a plan view of a portion of FIG. 3.
Figure 5:
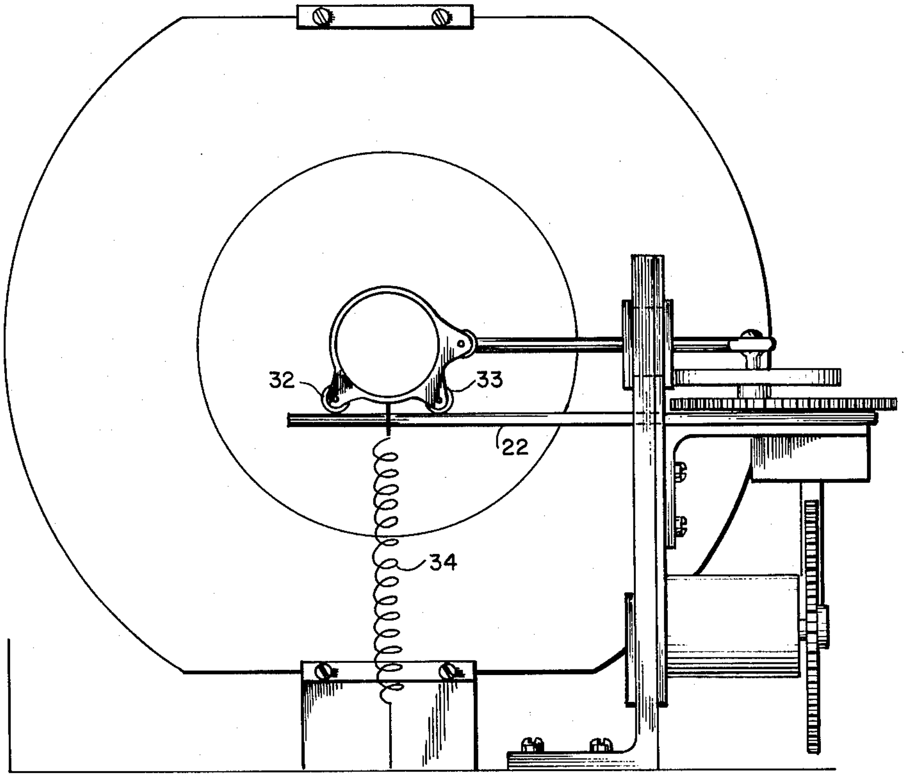
FIG. 5 is a vertical section.

A typical scanning mechanism is shown in FIGS. 3 to 5 the same parts bearing the same reference numerals. Here again the incoming radiation passes through the aperture tube as imaged by the spherical mirror 1 onto the detector 7. The chopper is shown in more detail with fixed blades 4 and movable blades 5. It is driven by the chopper motor 6.

The detector 7 is mounted in a tube and, except for a micrometric axial movement of the tube for focusing effected by the micrometer screw 19, all elements carried by the tube move together. To minimize noise pickup at at distance the preamplifier 9 is mounted in the tube adjacent to the detector. The rear end of the tube carries a rod 20 terminating in a ball joint 21 and permits the tube to move up and down or sideways. The center of the ball joint 21 is at the center of curvature of the mirror 1.

Horizontal scanning motion is effected by means of a motor 26 which is carried on a shelf on the platform 22 on which the detector tube is mounted. This motor drives a gear 27 and is provided with a ball joint crank 29. The operation is best seen in FIG. 4. The crank 29 moves a link 30 which is fastened to a yoke 32 by means of a ball joint. The yoke surrounds the tube carrying the detector. Free horizontal movement of the detector tube is provided by rollers 33 and contact with the platform shelf 22 is assured by the spring 34 (see FIG. 5). As the gear 27 moves the linkage 29, 30 and 31 moves the tube carrying the detector about the ball joint 21 as a pivot. Since this latter is at the center of curvature the detector moves along a surface concentric with the mirror 1.

Figure 6:
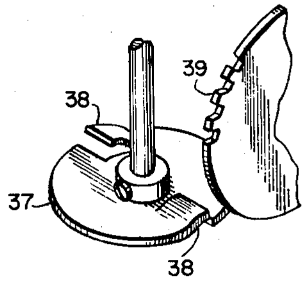
FIG. 6 is a detailed perspective view of the intermittent drive mechanism.

The gear 27 drives another gear 28 operating a horizontal potentiometer 35. The horizontal sweep of the detector is through about 22° but only the center 16° are actually utilized, the remaining 6° being occupied by the vertical movement during which the signal is blanked out by the horizontal potentiometer. The vertical movement can best be seen in FIG. 3. The shaft of the horizontal potentiometer drives an intermittent gear plate 36 provided with two flat portions 37 and two intermediate cam portions 38 which in turn mesh with a gear 39. The operation will be seen in FIG. 6. For each revolution which includes two horizontal scanning cycles the gear 39 will be moved up two teeth.

The vertical movement which is shown on FIG. 3 is effected by a portion of the platform 22 extended at 23 and journalled on an axis about the center of the ball joint 21. Although the axis goes through the center of the ball joint the actual element 23 is off set to one side as it is shown in FIG. 5. Movement is effected by the sector gear 24 on the portion of the platform 23 which meshes with a gear 25 driven by the gear 39 through a magnetic clutch 40.

In operation the horizontal motion causes the detector to scan horizontally in a series of lines and it moved upwardly to form a raster. All scans are about a pivot at the center of curvature of the mirror 1 and there is, therefore, no spherical aberration since the detector moves over a spherical surface concentric with the mirror. For some uses the plain spherical mirror will give adequate resolution and, of course, this affects an enormous economy in optics. However, where somewhat higher resolution is desirable a simple, a correcting plate of germanium or other suitable substance transparent to the infrared radiations of the particular waveband of interest can be used. Such a correcting plate is shown in FIGS. 3 and 4 at 18.

Figure 7:
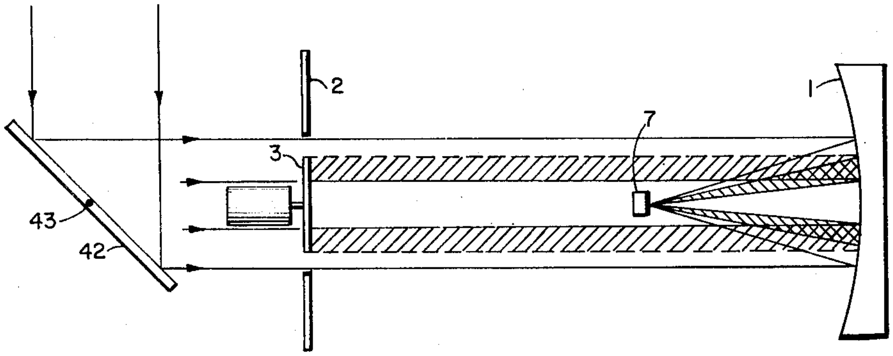
FIG. 7 is a diagrammatic section through a different type of scanning head with movable optics.

As has been stated above the particular scanning mechanism is not a part of the present invention in its broader aspects. However, scanning mechanisms in which the detector is moved as is described in FIGS. 1 to 6 present many advantages. This type of scanning mechanism is therefore preferred. But as it will be obvious the final output signal is in no way affected by the mechanism which produced the scanning. Accordingly, another type of scanning mechanism is illustrated in FIG. 7 and will be discussed briefly. The optics from the aperture are the same as in the foregoing figures and, of course, bear the same reference numerals. However, horizontal scanning is effected in a different manner. The detector 7 does not move but incoming radiation strikes a plane mirror 42 pivoted at 43 and this mirror is oscillated to move the image across the detector rather than the detector across the image. The net result is a scan and as far as the electrical output signal is concerned it does not know the difference.

Moving the mirror as in FIG. 7 produces excellent results but the mirror is somewhat heavier and the oscillation and the means for vertical scanning which may be by moving the detector or by a nutation of the axis 43 present somewhat greater structural problems. Also the device is not quite as rugged which is the reason, as stated before, that a movable detector scan which is illustrated in FIGS. 3 to 6 is preferred.

While movement of a mirror as shown in FIG. 7 will give good results it should not be confused with an attempt to move the mirror 1. This kind of scanning is less desirable. The mirror is heavy and while it can be moved it is very easy to upset optical alignment. While operative it is much less desirable.

All of the drawings show various types of catoptric optics. As far as the general radiation this type of optics presents great advantages in infrared work. The optics are achromatic and large apertures can be obtained cheaply, particularly in the case of the preferred embodiments of the present application where spherical mirrors can be used. However, scanning with dioptric optics is possible and while normally less desirable is completely operative and is included in a broader aspect of the present invention.

I claim:

1. Infrared scanning and electronic processing means comprising in combination, and optical alignment, an infrared detector, optical means for imaging a beam on the detector said means including an aperture, chopping means within said aperture dimensioned to chop only a portion of the beam passing through the aperture thus producing a chop frequency A.C. carrier signal, means for producing relative motion of detector and image so that the image is scanned in a raster, thereby modulating the chop frequency carrier, amplifying means for detector output, means for producing a reference signal at chop frequency, means connected to the output of the amplifying means constituting a high pass filter which does not pass D.C. and low frequency components of the detector signal, a sync detector receiving sync signal from a sync generator and an output from the amplifying means, a low pass filter, means connecting the output of the sync detector thereto whereby chopped frequency signals are eliminated and low frequency modulation of the chop frequency carrier are passed and means for combining the signals from the two filters to produce a composite video signal.

2. A device according to claim 1 in which the chop frequency is of the order of twice of that of the upper frequency of the high pass filter whereby the high band-pass filter effects a high degree of rejection at chop frequency.

3. A device according to claim 1 in which the optics are stationary and the detector moves to scan the image.

4. A device according to claim 1 in which the optical imaging means are catoptric.

5. A device according to claim 4 in which the catoptric optical imaging means comprises a spherical mirror.

6. A device according to claim 5 in which refractive, correcting means are inserted in the beam between the spherical mirror and the detector.

References Cited in the file of this patent

UNITED STATES PATENTS 2,653,185 Lubke ---------------- Sept. 22, 1953